(12) United States Patent
Jacobs et al.

(10) Patent No.: US 7,874,726 B2
(45) Date of Patent: Jan. 25, 2011

(54) THERMOCOUPLE

(75) Inventors: Loren Jacobs, Chandler, AZ (US); Mike Halpin, Scottsdale, AZ (US)

(73) Assignee: ASM America, Inc., Phoenix, AZ (US)

( * ) Notice: Subject to any disclaimer, the term of this patent is extended or adjusted under 35 U.S.C. 154(b) by 284 days.

(21) Appl. No.: 12/121,085

(22) Filed: May 15, 2008

(65) Prior Publication Data

US 2008/0289574 A1 Nov. 27, 2008

Related U.S. Application Data

(60) Provisional application No. 60/940,012, filed on May 24, 2007.

(51) Int. Cl.
*G01K 1/00* (2006.01)
*G01K 7/00* (2006.01)

(52) U.S. Cl. .................. 374/179; 374/208; 136/230

(58) Field of Classification Search .................. 374/179, 374/208; 136/230
See application file for complete search history.

(56) References Cited

U.S. PATENT DOCUMENTS

| 154,695 A | 9/1874 | Manly |
|---|---|---|
| 2,059,480 A | 11/1936 | Obermaier |
| 2,266,416 A | 12/1941 | Duclos |
| 3,011,006 A | 11/1961 | Nicholson |
| 3,913,058 A | 10/1975 | Nishio et al. |
| 4,217,463 A | 8/1980 | Swearingen |
| 4,377,347 A | 3/1983 | Hanmyo et al. |
| 4,527,005 A | 7/1985 | Mckelvey et al. |
| 4,592,307 A | 6/1986 | Jolly |
| 4,692,556 A | 9/1987 | Bollen et al. |
| 4,721,533 A * | 1/1988 | Phillippi et al. ............. 136/234 |
| 4,749,416 A * | 6/1988 | Greenspan .................. 136/232 |
| 4,976,996 A | 12/1990 | Monkowski et al. |
| 4,978,567 A | 12/1990 | Miller |
| 4,984,904 A | 1/1991 | Nakano et al. |

(Continued)

FOREIGN PATENT DOCUMENTS

EP 0229488 7/1987

(Continued)

OTHER PUBLICATIONS

PCT Notification of Transmittal of the International Search Report and the Written Opinion of the International Searching Authority, or the Declaration, dated Mar. 5, 2009, for International App. No. PCT/US2008/074063.

(Continued)

*Primary Examiner*—Lisa M Caputo
*Assistant Examiner*—Mirellys Jagan
(74) *Attorney, Agent, or Firm*—Snell & Wilmer L.L.P.

(57) ABSTRACT

A thermocouple having a support tube configured to receive a pair of wires of dissimilar metals. The pair of wires of the thermocouple connected at a junction adjacent to one end of the support tube. The thermocouple further including a cap attached to the opposing end of the support tube, wherein the cap receives the free ends of the pair of wires. The cap allowing the pair of wires to translate freely therethrough to accommodate the difference in thermal expansion and contraction of the pair of wires relative to the thermal expansion and contraction of the support tube.

9 Claims, 7 Drawing Sheets

U.S. PATENT DOCUMENTS

| | | | |
|---|---|---|---|
| 4,989,992 | A | 2/1991 | Piai |
| 5,027,746 | A | 7/1991 | Frijlink |
| 5,065,698 | A | 11/1991 | Koike |
| 5,104,514 | A | 4/1992 | Quartarone |
| 5,158,128 | A | 10/1992 | Inoue et al. |
| 5,181,779 | A * | 1/1993 | Shia et al. .................. 374/139 |
| 5,246,500 | A | 9/1993 | Samata et al. |
| 5,271,967 | A | 12/1993 | Kramer et al. |
| 5,315,092 | A | 5/1994 | Takahashi et al. |
| 5,336,327 | A | 8/1994 | Lee |
| 5,360,269 | A | 11/1994 | Ogawa et al. |
| 5,421,893 | A | 6/1995 | Perlov |
| 5,456,761 | A | 10/1995 | Auger et al. |
| 5,474,618 | A | 12/1995 | Allaire |
| 5,493,987 | A | 2/1996 | McDiarmid et al. |
| 5,514,439 | A | 5/1996 | Sibley |
| 5,562,774 | A | 10/1996 | Breidenbach et al. |
| 5,571,333 | A | 11/1996 | Kanaya |
| 5,697,706 | A | 12/1997 | Ciaravino et al. |
| 5,788,799 | A | 8/1998 | Steger et al. |
| 5,902,407 | A | 5/1999 | deBoer et al. |
| 5,904,778 | A | 5/1999 | Lu et al. |
| 5,910,221 | A | 6/1999 | Wu |
| 6,056,823 | A | 5/2000 | Sajoto et al. |
| 6,066,209 | A | 5/2000 | Sajoto et al. |
| 6,120,640 | A | 9/2000 | Shih et al. |
| 6,129,808 | A | 10/2000 | Wicker et al. |
| 6,170,429 | B1 | 1/2001 | Schoepp et al. |
| 6,227,140 | B1 | 5/2001 | Kennedy |
| 6,325,858 | B1 | 12/2001 | Wengert et al. |
| 6,342,691 | B1 | 1/2002 | Johnsgard et al. |
| 7,008,802 | B2 | 3/2006 | Lu |
| 7,166,165 | B2 | 1/2007 | Halpin |
| 2002/0011211 | A1* | 1/2002 | Halpin ...................... 118/715 |
| 2002/0043337 | A1 | 4/2002 | Goodman et al. |
| 2003/0002562 | A1 | 1/2003 | Yerlikaya et al. |
| 2003/0035905 | A1 | 2/2003 | Lieberman et al. |
| 2005/0101843 | A1 | 5/2005 | Quinn et al. |
| 2005/0141591 | A1 | 6/2005 | Sakano |
| 2008/0205483 | A1 | 8/2008 | Rempe et al. |
| 2008/0289574 | A1 | 11/2008 | Jacobs et al. |
| 2009/0052498 | A1 | 2/2009 | Halpin et al. |
| 2009/0159000 | A1 | 6/2009 | Aggarwal et al. |
| 2010/0145547 | A1 | 6/2010 | Darabnia et al. |

FOREIGN PATENT DOCUMENTS

| | | |
|---|---|---|
| EP | 0723141 | 7/1996 |
| FR | 1408266 | 8/1965 |
| GB | 0752277 | 7/1956 |
| JP | 05-023079 | 3/1993 |
| JP | 5-64627 | 3/1993 |
| JP | 09-089676 | 4/1997 |
| JP | 10-153494 | 6/1998 |
| JP | 10-227703 | 8/1998 |
| JP | 11-118615 | 4/1999 |
| JP | 11-183264 | 7/1999 |
| JP | 11-183265 | 7/1999 |
| JP | 11-287715 | 10/1999 |
| JP | 2004-113270 | 4/2004 |
| JP | 2005-172489 | 6/2005 |
| JP | 2006-090762 | 4/2006 |
| JP | 2006-153706 | 6/2006 |
| KR | 10-2000-0031098 | 6/2000 |
| KR | 10-2002-0086763 | 11/2002 |
| KR | 10-2003-0092305 | 12/2003 |
| WO | 9531582 | 11/1995 |
| WO | 9706288 | 2/1997 |
| WO | 9923276 | 5/1999 |
| WO | 0111223 | 2/2001 |

OTHER PUBLICATIONS

PCT Notification of Transmittal of the International Search Report and the Written Opinion of the International Searching Authority, or the Declaration, dated Nov. 27, 2009, for International App. No. PCT/US2009/043454.

International Search Report and Written Opinion for International Application No. PCT/US2010/033244 dated Jun. 29, 2010.

International Search Report and Written Opinion for International Application No. PCT/US2009/066377 dated Jul. 1, 2010.

Introduction to Materials Science for Engineers, 3rd Ed., James F. Schackelford, pp. 398, Macmillan Publishing Co. (1992).

Linke, J. and Vietzke, E., "Behavior of Boron Doped Graphites, Plasma Sprayed Boron Carbides and a-C/B H as Plasma Facing Material," J. Fusion Tech., V.20, pp. 228-231 (Sep. 1991).

Ponnekanti et al., "Failure Mechanisms of Anodized Aluminum Parts Used in Chemical Vapor Deposition Chambers," J. Vac. Sci. Technol. A 14(3) (May 1, 1996).

"Thermocouples for Silicon Process Technologies," Vulcan Electric Company brochure.

"Thermocouples for the Semiconductor Industry," Engelhard Corporation brochure (2004).

PCT Notification of Transmittal of the International Search Report and the Written Opinion of the International Searching Authority, or the Declaration, dated Aug. 21, 2008, for International App. No. PCT/US2008/063919.

Chinese Office Action dated Jul. 14, 2010.

PCT Notification of Transmittal of the International Search Report and The Written Opinion of the International Searching Authority, or the Declaration for Application No. PCT/US2010/033248 dated Jul. 29, 2010.

Non-Final Office Action for U.S. Appl. No. 12/140,809 dated Sep. 13, 2010.

* cited by examiner

THERMOCOUPLE

RELATED APPLICATIONS

The present patent document claims the benefit of the filing date under 35 U.S.C. §119(e) of Provisional U.S. Patent Application Ser. No. 60/940,012, filed May 24, 2007, which is hereby incorporated by reference herein.

FIELD OF THE INVENTION

The present invention relates to a temperature sensor, and more particularly to a temperature sensor configured to enhance accuracy of temperature control in a semiconductor processing apparatus.

BACKGROUND OF THE INVENTION

High-temperature semiconductor processing chambers are used for depositing various material layers onto a substrate surface or surfaces. One or more substrates or workpieces, such as silicon wafers, are placed on a workpiece support within the processing chamber. Both the substrate and workpiece support are heated to a desired temperature. In a typical processing step, reactant gases are passed over each heated substrate, whereby a chemical vapor deposition (CVD) reaction deposits a thin layer of the reactant material in the reactant gases on the substrate surface(s). Through subsequent processes, these layers are made into integrated circuits, and tens to thousands or even millions of integrated devices, depending on the size of the substrate and the complexity of the circuits.

Various process parameters must be carefully controlled to ensure the high quality of the resulting deposited layers. One such critical parameter is the temperature of the substrate during each processing step. During CVD, for example, the deposition gases react at particular temperatures to deposit the thin layer on the substrate. If the temperature varies greatly across the surface of the substrate, the deposited layer could be uneven which may result in unusable areas on the surface of the finished substrate. Accordingly, it is important that the substrate temperature be stable and uniform at the desired temperature before the reactant gases are introduced into the processing chamber.

Similarly, non-uniformity or instability of temperatures across a substrate during other thermal treatments can affect the uniformity of resulting structures on the surface of the substrate. Other processes for which temperature control can be critical include, but are not limited to, oxidation, nitridation, dopant diffusion, sputter depositions, photolithography, dry etching, plasma processes, and high temperature anneals.

Methods and systems are known for measuring the temperature at various locations near and immediately adjacent to the substrate being processed. Typically, thermocouples are disposed at various locations near the substrate being processed, and these thermocouples are operatively connected to a controller to assist in providing a more uniform temperature across the entire surface of the substrate. For example, U.S. Pat. No. 6,121,061 issued to Van Bilsen generally teaches a plurality of temperature sensors measuring the temperature at various points surrounding the substrate, including a thermocouple placed near the leading edge of the substrate, another near the trailing edge, one at a side, and another below the substrate near the center of the substrate.

However, thermocouples employed in measuring the temperature within the high-temperature processing chamber have been found to fail due to grain slip of the wires used in the thermocouple. The thermocouple typically includes an elongated ceramic member having longitudinal bores therewithin. A pair of wires extend the length of the bores, wherein one end of the wires are fused together and positioned adjacent to the substrate for temperature measurement purposes, and the opposing ends of the wires are connected to a controller. Typically, the ends of the wire opposite the temperature measuring ends exit the bores of the ceramic member and are bent, or crimped, and secured to the sheath surrounding the ceramic member in a substantially fixed manner. When the deposition processing step is taking place, the processing reactor is heated, thereby heating the ceramic member and the wires of the thermocouple. When heated, the wires expand longitudinally at a different rate than the ceramic, thereby causing longitudinal stresses in the wires. Because both ends of the wires are substantially fixed, after repeated cycles of heating and cooling the longitudinal stresses within the wires cause grain slip within the wires resulting in failure of the thermocouple. Accordingly, a thermocouple design that allows the wires located within the ceramic member to expand more longitudinally relative to the longitudinal expansion of the ceramic member is needed.

BRIEF SUMMARY OF THE INVENTION

A need exists for a temperature sensing thermocouple that accommodates the difference in amount of thermal expansion of the support member relative to the wires received therein. In one aspect of the present invention, a thermocouple is provided. The thermocouple includes a support tube having a pair of bores extending therethrough. The thermocouple also includes a pair of wires formed of dissimilar metals. Each of the wires is disposed within a different bore of the support tube. The thermocouple further includes a cap having a pair of apertures formed therethrough, wherein each of the apertures receives one of the wires. The cap is attached to the support tube such that the apertures are aligned with the bores, and the apertures are sized to allow the wires to slide freely through the apertures during thermal expansion or contraction of the wires.

In another aspect of the present invention, a cap connected to a support tube of a thermocouple is provided. The thermocouple includes a support tube having a pair of wires of dissimilar metals extending along the length of the support tube. The cap includes a body having a first end and a second end. A first bore extends into the body from the first end, and a second bore extends into the body from the second end. The first bore is configured to receive the support tube. A web separates the first bore and the second bore. A first aperture and a second aperture are formed through the web, and each aperture is configured to receive one of the wires. The first and second apertures are spaced apart a distance to maintain a spaced-apart relationship between the wires. The apertures are sized to allow the wires to freely translate therethrough when the wires expand or contract as a result of thermal expansion or contraction of the wires.

Advantages of the present invention will become more apparent to those skilled in the art from the following description of the embodiments of the invention which have been shown and described by way of illustration. As will be realized, the invention is capable of other and different embodiments, and its details are capable of modification in various

DETAILED DESCRIPTION OF THE PREFERRED EMBODIMENT

Figure 1:
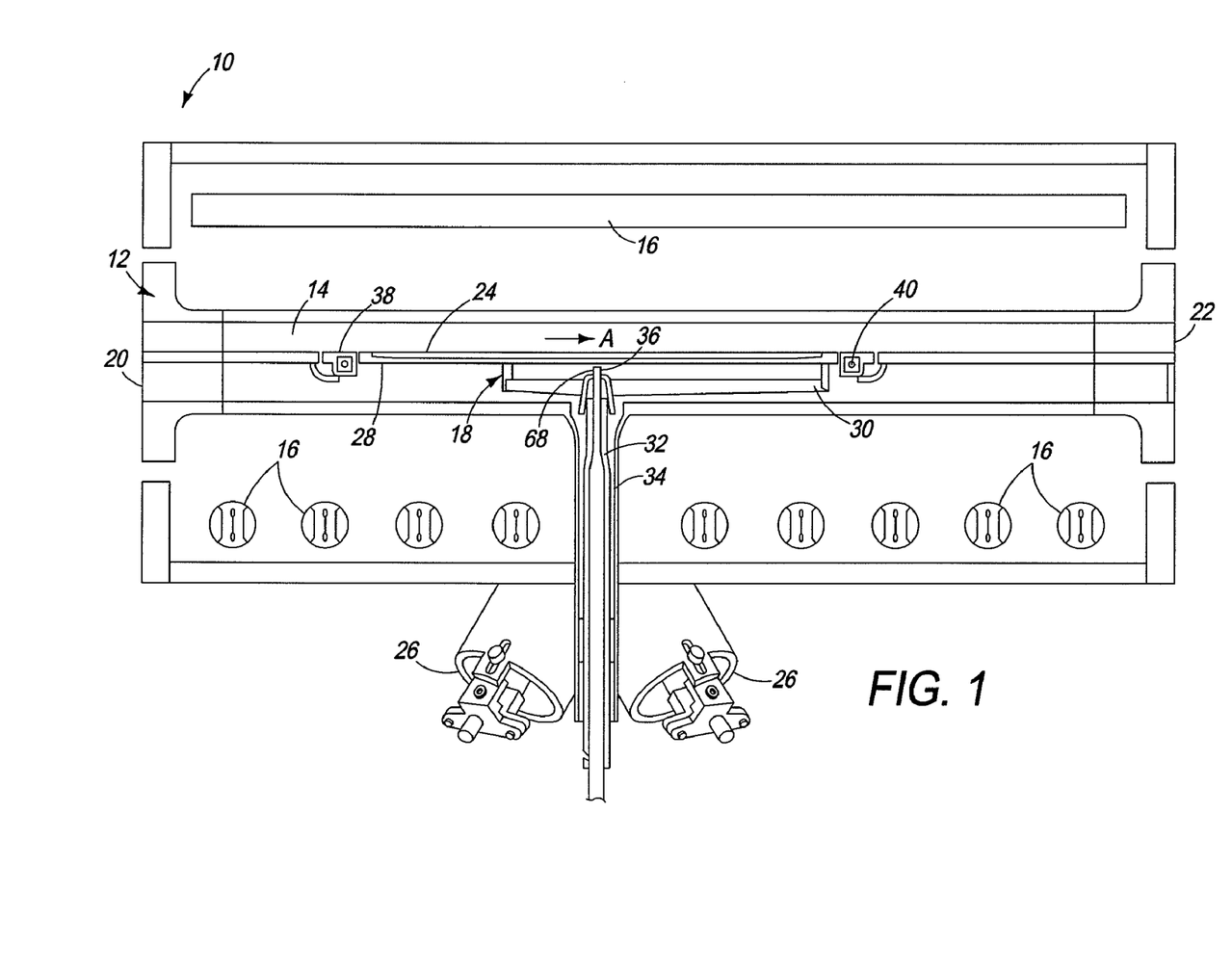
FIG. 1 is cross-sectional depiction of an exemplary chemical vapor deposition reactor.

Referring to FIG. 1, an exemplary embodiment of a chemical vapor deposition ("CVD") reactor 10 is shown. While the illustrated embodiment is a single substrate, horizontal flow, cold-wall reactor, it should be understood by one skilled in the art that the thermocouple technology described herein may be used in other types of semiconductor processing reactors as well as other applications requiring accurate temperature sensors. The reactor 10 includes a reaction chamber 12 defining a reaction space 14, heating elements 16 located on opposing sides of the reaction chamber 12, and a substrate support mechanism 18. The reaction chamber 12 is an elongated member having an inlet 20 for allowing reactant gases to flow into the reaction space 14 and an outlet 22 through which the reactant gases and process by-products exit the reaction space 14. In an embodiment, the reaction chamber 12 is formed of transparent quartz. It should be understood by one skilled in the art that the reaction chamber 12 may be formed of any other material sufficient to be substantially non-reactive relative to a deposition process therewithin.

The heating elements 16 form an upper bank and a lower bank, as shown in FIG. 1. The heating elements 16 are oriented in a spaced-apart manner relative to adjacent heating elements 16 within the same bank. In an embodiment, the heating elements 16 of the upper bank are oriented substantially perpendicular relative to the heating elements 16 of the lower bank. The heating elements 16 provide radiant energy to the reaction chamber 12 without appreciable absorption by the reaction chamber 12 walls. The heating elements 16 are configured to provide radiant heat of wavelengths absorbed by the substrate being processed as well as portions of the substrate support mechanism 18. In an embodiment, a plurality of spot lamps 26 provide concentrated heat to the underside of the wafer support mechanism 18 to counteract a heat sink effect caused by cold support structures extending upwardly through the bottom wall of the reaction chamber 12.

The substrate support mechanism 18 includes a substrate holder 28, upon which the substrate 24 may be disposed, and a support member 30, as shown in FIG. 1. The support member 30 is connected to a shaft 32 that extends downwardly through a tube 34 depending from the lower wall of the reaction chamber 12. A motor (not shown) is configured to rotate the shaft 32, thereby rotating the substrate holder 28 and substrate 24 in a like manner during the deposition process.

Figure 2:
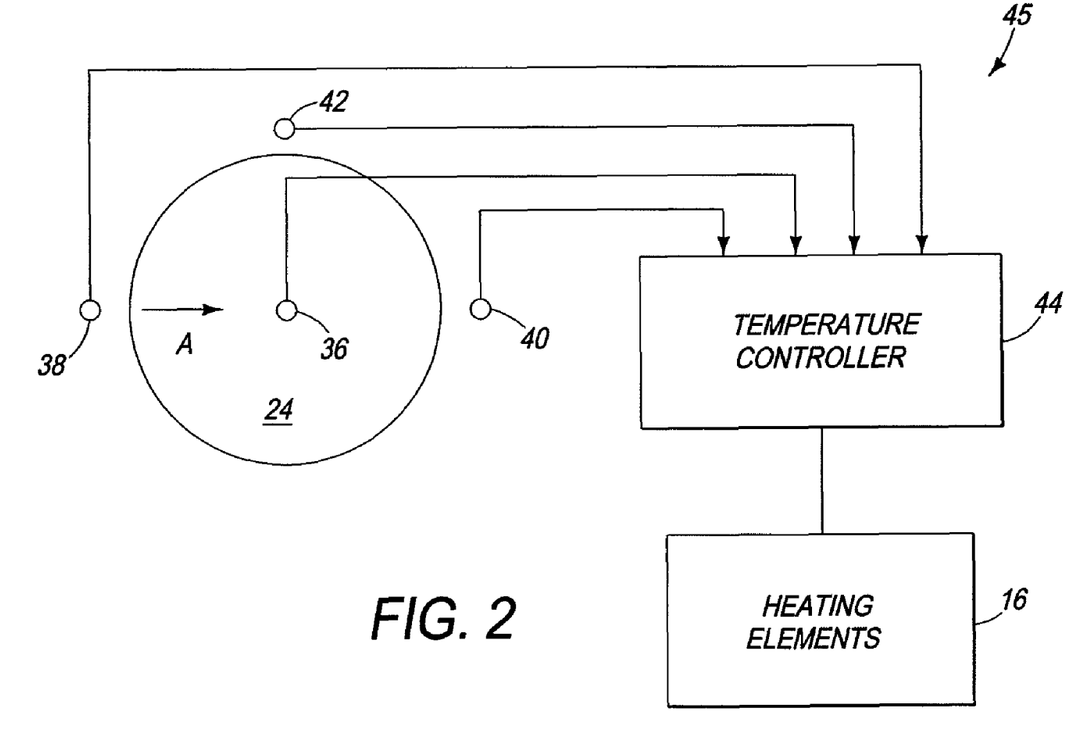
FIG. 2 is a schematic diagram of potential locations of temperature sensors and a temperature control system.

A plurality of temperature sensors are located adjacent to the substrate 24 and the substrate holder 28 for measuring temperatures at a variety of locations near the substrate 24, as shown in FIGS. 1-2. In the illustrated embodiment, the temperature sensors include: a central temperature sensor 36 located adjacent to the lower surface of the substrate holder 28, a leading edge temperature sensor 38, a trailing edge temperature sensor 40, and at least one side edge temperature sensor 42. The leading and trailing edge temperature sensors 38, 40 are located adjacent to the front and rear edges of the substrate 24 relative to the direction of flow A of the reactant gases within the reaction space 14. The temperature sensors are configured to measure the temperature in the localized area immediately surrounding the tip of the temperature sensor. A temperature control system 45, as illustrated in FIG. 2, for a chemical vapor deposition reactor 10 includes a plurality of temperature sensors 36, 38, 40, 42 located adjacent to a substrate 24 being processed, wherein the temperature sensors are operatively connected to a temperature controller 44 for providing temperature data at the particular location to the controller 44. The controller 44 is operatively connected to at least one heating element 16 disposed adjacent to a substrate 24. The temperature controller 44 is configured to selectively adjust the energy emitted from the heating element(s) 16, 26 in response to data provided by the temperature sensors to maintain a substantially uniform temperature distribution across the entire substrate 24 being processed. It should be understood by one skilled in the art that the temperature control system 45 may include any number of temperature sensors disposed at different locations for providing data to the controller 44.

Figure 3:
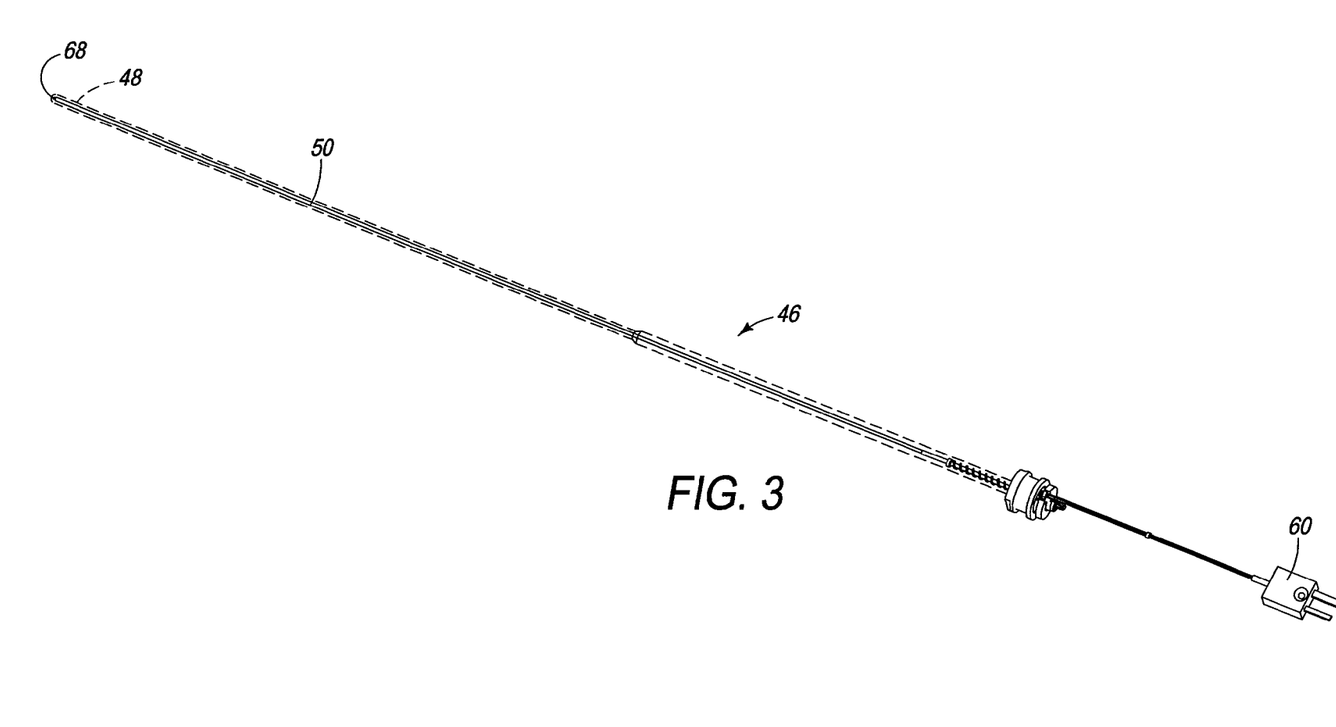
FIG. 3 is an embodiment of a thermocouple.
Figures 4, 5, 6, 7:
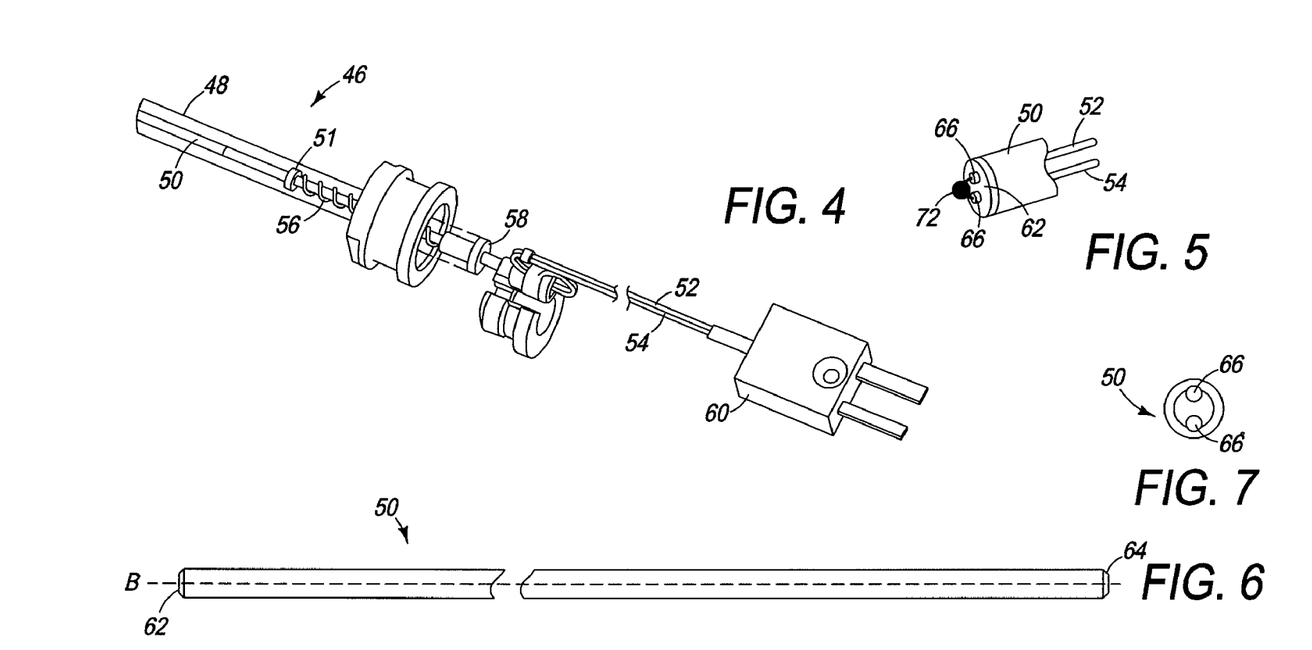
FIG. 4 is a magnified, exploded view of the thermocouple of FIG. 3.
FIG. 5 is a magnified view of a junction of wires forming a thermocouple.
FIG. 6 is a side view of an embodiment of a support tube.
FIG. 7 is an end view of the support tube of FIG. 6.

In an embodiment, at least one of the temperature sensors 36, 38, 40, 42 is a thermocouple 46, as illustrated in FIGS. 3-14. It should be understood by one skilled in the art that the other temperature sensors 36, 38, 40, 42 may be formed as optical pyrometers, thermocouples, or any other temperature sensing device capable of withstanding the conditions within the reaction chamber, or any combination thereof. In an embodiment, the thermocouple 46, as shown in FIGS. 3-4, includes a sheath 48, a support tube 50, a collar 51, a first wire 52, a second wire 54, a spring 56, a retainer 58, and a plug 60. In an embodiment, the support tube 50 is a substantially cylindrical, elongated member having a longitudinal axis B, as illustrated in FIGS. 6-7. In another embodiment, the cross-sectional shape of the support tube 50 is square. In yet another embodiment, the cross-sectional shape of the support tube 50 is oval. It should be understood by one skilled in the art that the cross-sectional shape of the support tube 50 may be formed as any shape. The support tube 50 may be formed of any type of ceramic or other material sufficient to withstand the cyclic temperature variations as well as the range of temperatures to which the thermocouple 46 is exposed. It should be understood by one skilled in the art that although the illustrated thermocouple 46 is substantially linear, the thermocouple 46 may be formed of any shape sufficient to allow the measuring tip 68 of the thermocouple 46 to be disposed at a desired location.

The support tube 50 of the thermocouple 46 includes a first distal end 62 and an opposing second distal end 64, as shown in FIG. 6. In an embodiment, the support tube 50 includes a pair of bores 66, as shown from the end view in FIG. 7, extending longitudinally from the first distal end 62 to the second distal end 64. In another embodiment, the support tube 50 includes more than two bores 66 extending at least a portion of the distance between the first distal end 62 of the support tube 50 and the second distal end 64. It should be understood by one skilled in the art that the support tube 50 may include any number of bores or holes formed therein either longitudinally or at any other angle relative to the longitudinal axis of the ceramic member. One of the bores 66 is adapted to receive the first wire 52, and the other of the bores 66 is adapted to receive the second wire 54. The bores 66 are disposed in a spaced-apart manner to separate the first and second wires 52, 54 to prevent a short circuit. The bores 66 are sized to receive the first and second wires 52, 54 therewithin and provide a small gap between the outer surface of the wires 52, 54 and the inner surface of the bores 66. In an embodiment, the diameter of each bore 66 is about 0.016 inches. In another embodiment, the diameter of each bore 66 is about 0.014 inches. It should be understood by one skilled in the art that the bores 66 can have any diameter sufficient to receive a first and second wire 52, 54 while providing a gap between the wires and the surface of the corresponding bore to allow the wires 52, 54 to expand radially and longitudinally as a result of thermal expansion.

Figure 8:
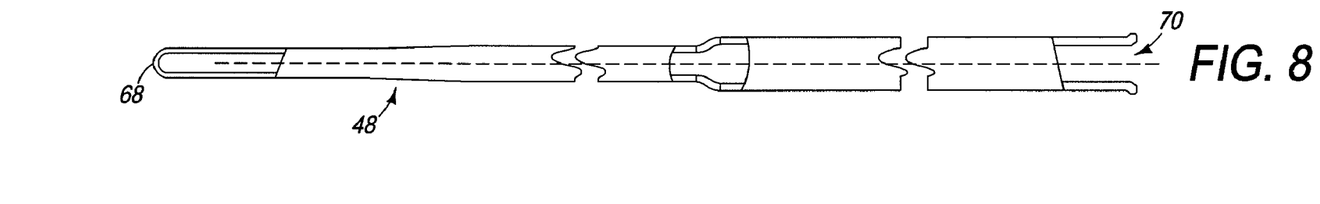
FIG. 8 is a side, partial cross-sectional view of an embodiment of a sheath for a thermocouple.

The support tube 50 is at least partially disposed within a protective sheath 48, as shown in FIGS. 4 and 8. In an embodiment, the sheath 48 is formed of a transparent quartz material. The transparent quartz material allows substantially all of the radiant energy emitted from the heating elements 16 and the spot lamps 26 to pass therethrough without a noticeable increase in temperature of the sheath 48. In an embodiment, the sheath 48 has the same general cross-sectional shape as the support tube 50 disposed therewithin, but the sheath 48 is slightly larger to provide a small gap between the inner surface of the sheath 48 and the outer surface of the support tube 50. The sheath 48 includes a measuring tip 68 at one end thereof and an opening 70 at the opposing end thereof. In another embodiment, the sheath 48 may be coated with silicon nitride (SiN) or have other surface treatments applied thereto to extend the life of the sheath during chemical vapor deposition ("CVD") processing in the reaction chamber 12. In yet another embodiment, a cap (not shown), such as a silicon-carbide (SiC) cap, is applied at the measuring tip 68 of the sheath to provide better heat transfer between the ambient environment and the wires 52, 54.

As shown in FIGS. 3 and 8, the measuring tip 68 is located at the distal end of the sheath 48. When the thermocouple 46 is employed as a central temperature sensor 36 (FIG. 1), the measuring tip 68 is located immediately adjacent to the lower surface of the substrate holder 28. At this location, the measuring tip 68 of the thermocouple 46 is configured to measure the temperature of the substrate holder 28 immediately adjacent thereto. At the end of the sheath 48, within the measuring tip 68, the first and second wires 52, 54 extend beyond the first distal end 62 of the support tube 50, as shown in FIG. 5. The exposed ends of the first and second wires 52, 54 are fused together to form a junction 72 bead, thereby providing an electrical connection between the first and second wires 52, 54. In one embodiment, the first and second wires 52, 54 are melted together to form the junction 72. In another embodiment, the first and second wires 52 are fused together by soldering. It should be understood by one skilled in the art that the first and second wires 52, 54 can be fused together in any manner sufficient to provide an electrical connection between the ends of the first and second wires 52, 54. The free ends of the wires 52, 54 opposite the junction 72 extend from the second distal end 64 of the support tube 50. The wires 52, 54 are formed of dissimilar metals to form a thermocouple therebetween. In an embodiment, the first wire 52 is formed of Platinum, and the second wire 54 is formed of a Platinum alloy having 13% Rhodium. It should be understood by one skilled in the art that the wires 52, 54 can be formed of any dissimilar metals sufficient to form a thermocouple therebetween. In an embodiment, the diameter of the wires 52, 54 are about 0.010 inches. In another embodiment, the diameter of the wires 52, 54 are about 0.014 inches. It should be understood by one skilled in the art that the wires can be of any diameter sufficient to withstand the cyclical temperature changes during CVD processing as well as withstand the range of temperatures to which the thermocouple 46 is exposed. It should also be understood by one skilled in the art that the diameter of the first and second wires 52, 54 may not be the same diameter.

Figure 10:
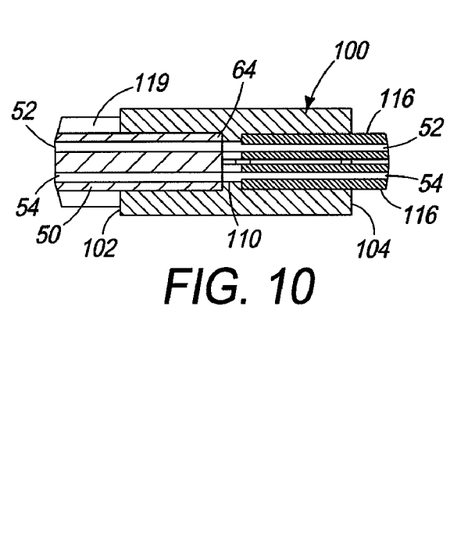
FIG. 10 is a magnified, cross-sectional view of an embodiment of a cap for a thermocouple.

The first and second wires 52, 54 extend from the junction 72 through the spaced-apart bores 66 formed in the support tube 50 and exit the bores 66 at the second distal end 64 of the support tube 50, as shown in FIG. 10. The second distal end 64 of the support tube 50 extends outwardly beyond the opening 70 of the sheath 48. As shown in FIG. 4, a collar 51 is operatively connected to the outer surface of the support tube 50 at a spaced-apart distance from the second distal end 64 of the support tube 50. In an embodiment, the collar 51 may be formed separately from the support tube 50 and later fixedly attached to the support tube 50. In another embodiment, the support tube 50 and the collar 51 may be formed as a single member. The collar 51 provides a contact surface against which one end of the spring 56 is maintained.

Figure 9:
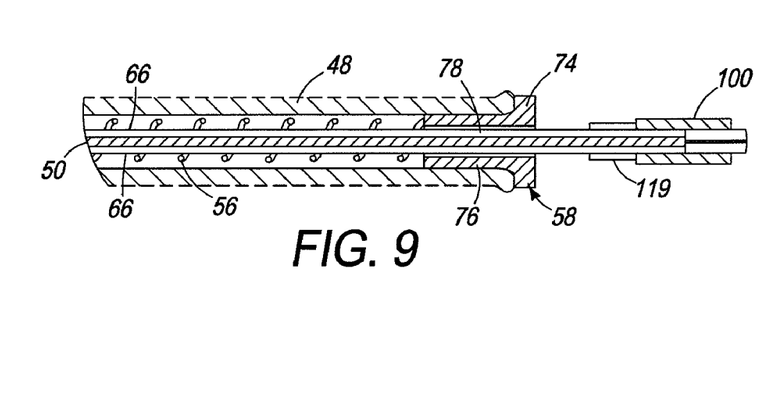
FIG. 9 is a magnified, cross-sectional view of the thermocouple of FIG. 3.

A retainer 58, as shown in FIGS. 4 and 9, is disposed within the opening 70 of the sheath 48. The retainer 58 includes a ring 74, a body 76, and an aperture 78 extending longitudinally through the ring 74 and body 76. The retainer 58 is disposed adjacent to the end of the sheath 48 and is configured to receive the support tube 50 within the aperture 78. In an embodiment, the retainer 58 is secured within the opening 70 of the sheath 48 by an interference fit, or friction fit. It should be understood by one skilled in the art that the retainer 58 may be secured to the sheath 48 by any other means sufficient to maintain the retainer 58 in a substantially fixed relationship relative to the sheath 48. The retainer 58 provides an outlet from the sheath 48 through a reduced diameter, thereby maintaining the support tube 50 in a spaced-apart manner relative to the inner surface of the sheath 48. The support tube 50 is disposed within the aperture 78 of the retainer 58 such that the support tube 50 is free to translate within the aperture 78 in a direction substantially parallel to the longitudinal axis B of the support tube 50.

Referring to FIG. 4, a spring 56 is located about the outer surface of the support tube 50 between the collar 51 and the retainer 58. The spring 56 applies a spring, or biasing, force onto the collar 51 to bias the support tube 50 toward the measuring tip 68 of the sheath 48. In an embodiment, the spring 56 is configured to maintain the junction 72 formed by the first and second wires 52, 54 in contact with the measuring tip 68 of the sheath 48. If the junction 72 were to move away from the measuring tip 68, the accuracy of the measured temperature would decrease as the junction 72 is spaced a greater distance away from the location being measured. Accordingly, the spring 56 can be configured to bias the junction 72 into contact with the measuring tip 68, thereby ensuring the junction 72 is touching or located immediately adjacent to the inner surface of the measuring tip 68.

As shown in FIGS. 4 and 9-10, the second distal end 64 of the support tube 50 extends beyond the sheath 48 through the retainer 58. In the illustrated embodiment, a cap 100 is operatively attached to the second distal end 64 of the support tube 50 in a substantially fixed manner such that the cap 100 is prevented from rotating relative to the support tube 50. In an embodiment, the cap 100 is formed of Delrin® plastic. In another embodiment, the cap 100 is formed of polyetheretherkeytones (PEEK). In yet another embodiment, the cap 100 is formed of polyetherimide (PEI). For high-temperature applications, PEEK and PEI provide greater durability. It should be understood by one skilled in the art that the cap 100 may be formed of any material sufficient to withstand large temperature ranges as well as resist torsional movement relative to the sheath 48.

In an embodiment, as illustrated in FIGS. 10A-10E, the cap 100 is an elongated, one-piece cylindrical member having a body 101, a first end 102, and a second end 104. In another embodiment, the body 101 of the cap 100 has a square cross-sectional shape. It should be understood by one skilled in the art that the body 101 of the cap 100 may have any cross-sectional shape. At the first end 102, a first bore 106 is formed into the body 101. The first bore 106 extends from the first end 102 along at least a portion of the longitudinal length of the body 101. In an embodiment, the first bore 106 is circular. The first bore 106 is configured to receive the second distal end of the support tube 50. Accordingly, the shape of the first bore 106 is substantially the same size and shape as the outer surface of the support tube 50. A second bore 108 is formed into the second end 104 of the body 101. In an embodiment, the second bore 108 extends from the second end 104 along at least a portion of the longitudinal length of the cap 100. The cross-sectional shape of the second bore 108 may be round, oval, square, or any other shape sufficient to envelop the first and second wires 52, 54 as the wires exit the support tube 50. In an embodiment, the cross-sectional shape of the second bore 108 is the same as the first bore 106. In another embodiment, the cross-sectional shape of the second bore 108 is different than the first bore 106.

Figures 10A, 10B, 10C:
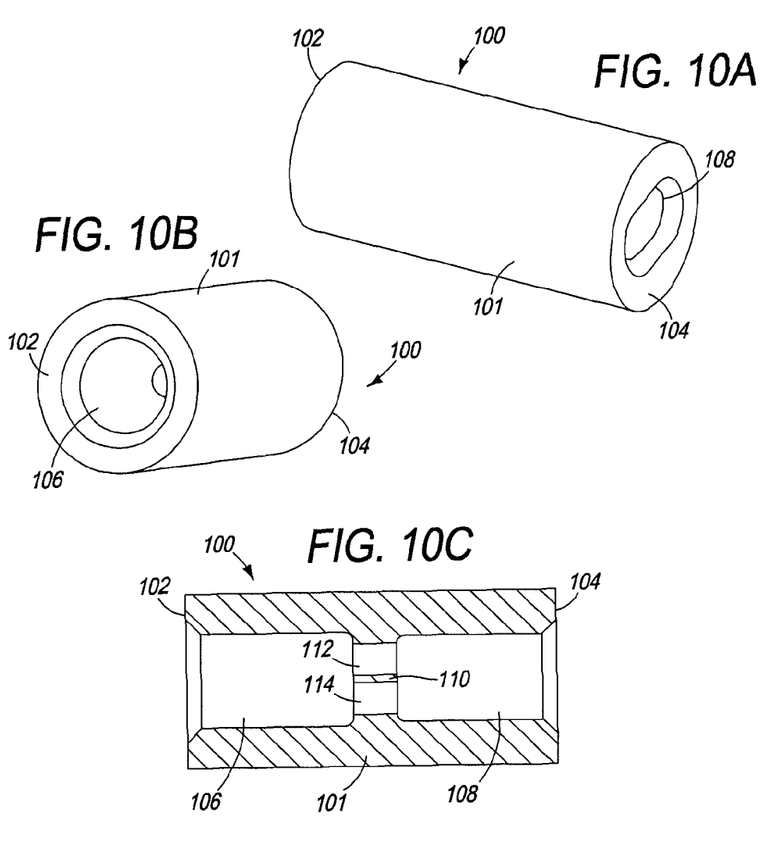
FIG. 10A is a side elevation view of an embodiment of a cap.
FIG. 10B is another side elevation view of the cap of FIG. 10A.
FIG. 10C is a cross-sectional view of the cap of FIG. 10A.
Figure 10D:
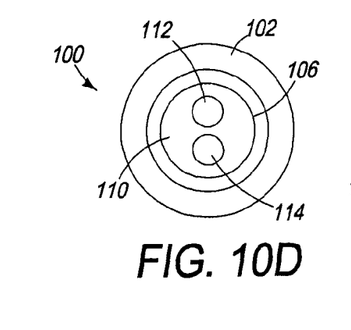
FIG. 10D is an end view of the cap of FIG. 10A.
Figure 10E:
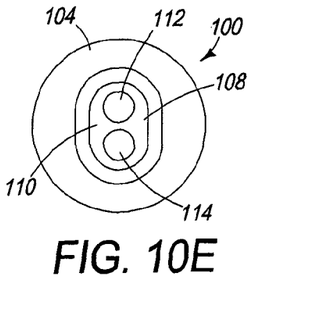
FIG. 10E is an end view of the opposite end of the cap shown in FIG. 10D.

In an embodiment, the first bore 106 and the second bore 108 extend from the first and second ends 102, 104 of the cap 100, respectively, substantially the same distance, as shown in FIG. 10C. It should be understood by one skilled in the art that the length of the first and second bore 106, 108 may be the same, the first bore 106 may be longer than the second bore 108, or the second bore may be longer than the first bore 106. In an embodiment, the size and shape of the first and second bores 106, 108 are substantially the same such that either bore may receive the second distal end 64 of the support tube 50, thereby ensuring that the cap 100 is correctly assembled in the thermocouple 46. In another embodiment, the size and shape of the first and second bores 106, 108 are different such that the first bore 106 is the only bore capable of receiving the second distal end 64 of the support tube 50.

As shown in FIG. 10C, the first and second bores 106, 108 are separated by a web 110. The web 110 forms the base of both bores 106, 108 in the cap 100. The surface of the web 110 at the base of the first bore 106 can be substantially the same shape as the end surface of the second distal end 64 of the support tube 50 such that the end surface of the second distal end 64 is disposed in an abutting relationship with the corresponding surface of the web 110. A first aperture 112 and a second aperture 114 are formed through the web 110. The first aperture 112 is configured to receive the first wire 52 that extends from the second distal end 64 of the support tube 50, and the second aperture 114 is configured to receive the second wire 54 that likewise extends from the second distal end 64 of the support tube 50. In an embodiment, the diameter of the first and second apertures 112, 114 are substantially the same diameter as the diameter of the bores 66 of the support tube 50. In another embodiment the diameter of the first and second apertures 112, 114 are slightly larger than the diameter of the corresponding bores 66 of the support tube 50. The gap between the inner surface of the apertures 112, 114 and the wires 52, 54 received therein allows the wires 52, 54 to expand or contract radially as well as translate in the longitudinal direction within the apertures 112, 114 due to thermal expansion or contraction. In an embodiment, the diameter of the first and second apertures 112, 114 is larger than about 0.010 inches. In another embodiment, the diameter of the first and second apertures 112, 114 is larger than about 0.014 inches. In yet another embodiment, the diameter of the first and second apertures 112, 114 is about 0.016 inches. It should be understood by one skilled in the art that the diameters of the apertures 112, 114 should be slightly larger than the diameter of the wire 52, 54 received therein to allow the wires 52, 54 to freely radially expand or contract or translate therethrough when the wires 52, 54 are subject to thermal expansion or contraction. In an embodiment, the diameter of the first aperture 112 is substantially the same as the diameter of the second aperture 114. In another embodiment, the diameter of the first aperture 112 is different than the diameter of the second aperture 114.

During assembly, the first and second apertures 112, 114 are aligned with the bores 66 of the support tube 50 such that the first and second wires 52, 54 extend from the second distal end 64 of the support tube 50 and through the web 110 of the cap 100 in a substantially linear manner, as shown in FIG. 10. The portion of the wires 52, 54 extending from the second distal end 64 of the support tube 50 are pulled through the web 110 such that the second distal end 64 of the support tube 50 contacts the corresponding surface of the web 110, thereby positively locating the support tube 50 within the cap 100. Upon assembly, there should be no gap between the second distal end 64 of the support tube 50 and the web 110 of the cap 100. By aligning the apertures 112, 114 in the web 110 with the bores 66 of the support tube 50, any potential shearing stress resulting from a mis-aligned cap 100 relative to the support tube 50 can be greatly reduced or eliminated. Additionally, a properly aligned cap 100 also ensures that the wires 52, 54 remain spaced apart, thereby avoiding a potential short circuit if the wires 52, 54 were to contact each other. As the wires 52, 54 extend through the bores 66 of the support tube 50 and through the apertures 112, 114 in the web 110 of the cap 100, the wires remain separated and exposed, without a protective covering. The spaced-apart bores and apertures safely maintain the wires 52, 54 in a spaced-apart, separated relationship.

In an embodiment, the first and second wires 52, 54 that extend from the support tube 50 through the apertures 112, 114 in the cap 100 are covered with a Teflon® tube 116 to further prevent the wires from contacting each other and causing a short circuit, as shown in FIG. 10. The second bore 108 formed in the cap 100 is sized to receive both the first and second wires 52, 54 having the Teflon® tube 116 encasing each wire. Each of the wires 52, 54 is inserted into a tube 116 such that the end of each tube 116 is located within the second bore 108 of the cap 100. In an embodiment, the end of both tubes 116 covering the wires 52, 54 are in an abutting relationship with the web 110 prior to the thermocouple 46 being installed into a tool. In another embodiment, the end of both tubes 116 are slightly spaced-apart from the web 110 to ensure that the first and second wires 52, 54 are not in tension when assembled. The tubes 116 cover each of the wires 52, 54 between the cap 100 and the plug 60, to which the wires 52, 54 are attached. In the embodiment illustrated in FIGS. 10A and 10E, the second bore 108 is oval shaped so that the opening of the second bore 108 is large enough to receive the pair of tubes 116 surrounding the first and second wires 52, 54 while preventing the first and second wires 52, 54 from twisting together as the wires exit the web 110.

Figure 11:
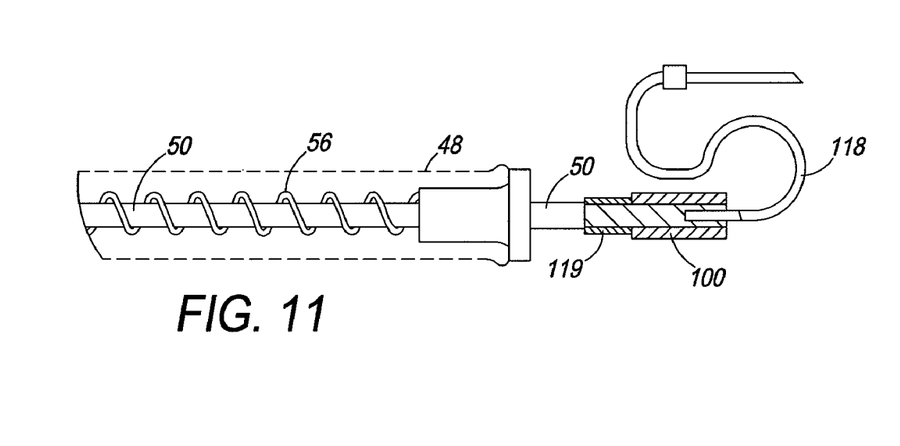
FIG. 11 is a magnified cross-sectional view of a portion of the thermocouple of FIG. 3.

FIGS. 9-14 illustrate an exemplary assembly process for assembling the thermocouple 46. FIGS. 9-10 show the support tube 50 inserted into the first bore 106 of the cap 100 in which the first and second apertures 112, 114 through the web 110 of the cap 100 are aligned with the bores 66 of the support tube 50 such that the wires 52, 54 remain substantially linearly aligned and in a spaced-apart relationship. The wires 52, 54 extending from the first and second apertures 112, 114 in the cap 100 are covered by the Teflon® tubes 116. FIG. 11 shows that the covered wires 52, 54 form a loop 118 extending from the second bore 108 of the cap 100. In an embodiment, the radius of curvature of the loop 118 is about 12 mm. In an embodiment, the radius of curvature of the loop 118 is between about 2 mm and about 25 mm. In another embodiment, the radius of curvature of the loop 118 is between about 2 mm and about 12 mm. In a further embodiment, the radius of curvature of the loop 118 is about 5 mm. It should be understood by one skilled in the art that the loop 118 formed by the first and second wires 52, 54 can have any radius of curvature sufficient to allow the first and second wires 52, 54 to freely translate longitudinally within the corresponding bores 66 of the support tube 50 without tension or compression stresses being introduced into the wires 52, 54.

Figure 12:
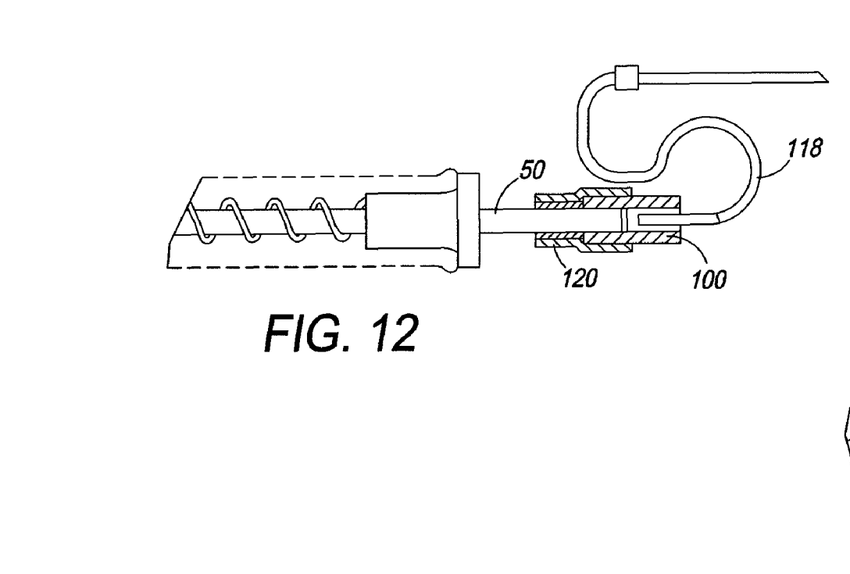
FIG. 12 is a magnified cross-sectional view of a portion of the thermocouple of FIG. 3.
Figure 13:
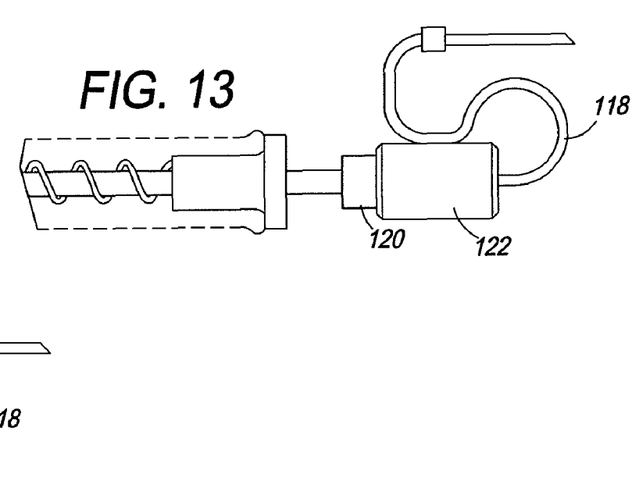
FIG. 13 is a magnified cross-sectional view of a portion of the thermocouple of FIG. 3.
Figure 14:
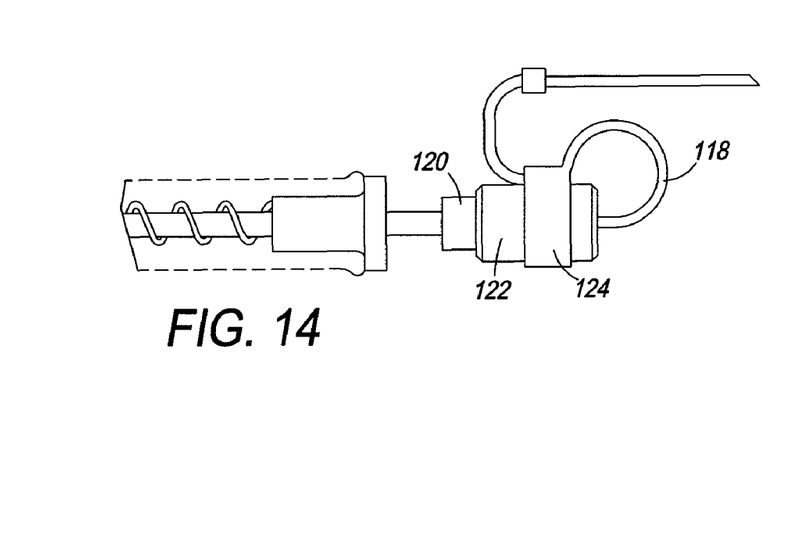
FIG. 14 is a magnified cross-sectional view of a portion of the thermocouple of FIG. 3.

In an embodiment, a first shrink sleeve 119 is disposed about the support tube 50, as shown in FIGS. 9-11. When the support tube 50 is inserted into the first bore 106 of the cap 106 and properly aligned, the first shrink sleeve 119 is disposed adjacent to the first end 102 of the cap 100. FIG. 12 illustrates an embodiment in which a second shrink sleeve 120 is disposed about the first end 102 of the cap 100 and the first shrink sleeve 119. The first shrink sleeve 119 provides an increased diameter about the support tube 50 in the area adjacent to the first end 102 of the cap 100 to provide a more secure connection between the second shrink sleeve 120 and the first shrink sleeve 119 and cap 100. The second shrink sleeve 120 is adapted to maintain the alignment between the bores 66 in the support tube 50 with the first and second apertures 112, 114 in the web 110 of the cap 100. The second shrink sleeve 120 is also configured to prevent rotation of the cap 100 relative to the support tube 50. In another embodiment, the cap 100 includes an indexing detent (not shown) and the support tube 50 includes an indexing protrusion (not shown) adapted to be received in the indexing detent to positively locate the cap 100 relative to the support tube 50 and to prevent rotation of the cap 100 relative to the support tube 50. In yet another embodiment, the second distal end 64 of the support tube 50 is flattened and the first bore 106 in the cap has a corresponding cross-sectional area, thereby preventing the cap 100 from rotating relative to the support tube 50. After the second shrink sleeve 120 is connected, a protective sleeve 122 is disposed about the cap 100 and the support tube 50, as shown in FIG. 13. FIG. 14 illustrates a band 124 operatively connected about the protective sleeve 122 to secure a portion of the loop 118 to the protective sleeve 122. The band 124 secures a portion of the loop 118 to maintain a predetermined radius of curvature of the loop 118. The assembled thermocouple 46 is then incorporated into a machine or tool requiring a temperature sensor.

In operation, the measuring tip 68 of the sheath 48 is disposed at a position at which a temperature measurement is desired. As the temperature about the thermocouple 46 increases or decreases, the support tube 50 and the wires 52, 54 expand or contract, particularly along the longitudinal axis B of the support tube 50. In an embodiment, the coefficient of thermal expansion of the wires 52, 54 is substantially different than the coefficient of thermal expansion of the support tube 50, wherein the amount of thermal expansion of the wires 52, 54 in the longitudinal direction is greater than the thermal expansion of the support tube 50 in the same direction. In another embodiment, the coefficient of thermal expansion of the wires 52, 54 is similar to the coefficient of thermal expansion of the support tube 50. In a further embodiment, the coefficient of thermal expansion of the wires 52, 54 is substantially the same as the coefficient of thermal expansion of the support tube 50. As the support tube 50 expands in the longitudinal direction, the cap 100 attached to the second distal end 64 of the support tube 50 translates in the same manner. The cap 100 does not prevent the support tube 50 from expanding or contracting freely along the longitudinal axis B, thereby eliminating any longitudinal stresses that would otherwise result if the second distal end 64 of the support tube 50 were fixed relative to the sheath 48. The cap 100 also maintains the alignment of the wires 52, 54 exiting the support tube 50 such that the wires 52, 54 remain in a spaced-apart relationship, thereby preventing a short circuit.

When the wires 52, 54 expand or contract in the longitudinal direction a greater magnitude than the support tube 50, the wires 52, 54 freely slide, or translate, through the corresponding aperture 112, 114 of the cap 100. The apertures 112, 114 allow the wires 52, 54 to freely expand or contract relative to the support tube 50, thereby reducing or eliminating the tension or compression stresses applied to the wires 52, 54 that would otherwise be introduced if the free ends of the wires were folded or substantially fixed relative to the support tube 50. The wires 52, 54 are free to translate through the apertures 112, 114 without significant resistance introduced by the apertures themselves, such as resistance that would result if the apertures 112, 114 formed a snug fit or interference fit around the wires 52, 54. The apertures 112, 114 should be sized to provide a small gap between the inner surface of the aperture and the outer surface of the corresponding wire. When the wires 52, 54 expand and translate through the corresponding apertures 112, 114, the Teflon® tubes 116 remain in a substantially fixed relationship with the wires 52, 54 such that a portion of the wires 52, 54 become exposed within the cap 100 as the wires 52, 54 expand. It should be understood by one skilled in the art that the distance between the apertures 112, 114 formed through the web 110 of the cap 100 be spaced apart a sufficient distance such that when a portion of the wires 52, 54 is exposed when the wires 52, 54 thermally expand longitudinally as a result of an increase in temperature of the wires 52, 54, the exposed portions of the wires 52, 54 remain sufficiently spaced apart such that they do not contact each other to cause a short circuit. Further, the loop 118 expands or contracts in a corresponding manner as the wires 52, 54 expand or contract due to thermal expansion or contraction. Accordingly, the radius of curvature of the loop 118 should be sufficient to allow the wires 52, 54 to freely expand or contract without introducing any additional axial loads to the wires 52, 54. Allowing the wires 52, 54 to freely expand or contract in response to the change in temperature of the wires increases the longevity of the thermocouple 46 by reducing or eliminating axial loads that tend to cause grain slip, and eventually premature failure, of the wires 52, 54.

As discussed above, the coefficient of thermal expansion of the support tube 50 can be different than the coefficient of thermal expansion of the wires 52, 54. In addition, the support tube 50 dissipates energy into the surrounding environment through the outer and end surfaces of the support tube, whereas the energy dissipated from the wires 52, 54 is transferred to the support tube 50. It should be noted that the support tube 50 will expand at a different rate than the first and second wires 52, 54 due to a temperature difference therebetween. During dynamic temperature changes within the reaction chamber 12, the support tube 50 will generally be at a different temperature than the wires 52, 54 received therein due to the differences in the thermal conductivity and specific heat as well as the rate at which energy is dissipated between the support tube 50 and the wires 52, 54. Accordingly, the improved thermocouple 42 allows the wires 52, 54 to thermally expand or contract independent of the support tube 50 such that additional compression or tension stresses are not introduced into the wires 52, 54 as they expand or contract relative to the support tube 50.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

What is claimed is:

1. A thermocouple comprising:
   a support tube having a first distal end, a second distal end, and a longitudinal axis, said support tube including a pair of bores extending between said first distal end and said second distal end;
   a sheath disposed about at least a portion of said support tube;
   a first wire disposed within one of said bores;
   a second wire disposed within the other of said bores, said second wire formed of a different metal than said first wire;
   a junction formed between an end of said first wire and an end of said second wire, wherein said junction is located adjacent to said first distal end of said support tube; and
   a cap operatively attached to said second distal end of said support tube, said cap having a first bore to receive said second distal end of said support tube and a second bore through which said first and second wires extend, said cap further including a web formed between said first and second bore, said web including a first aperture for receiving said first wire and a second aperture for receiving said second wire, said apertures being sized to allow said first and second wires to slide freely therethrough in response to thermal expansion or contraction of said first and second wires; and
   a loop formed of a portion of said first and second wires extending from said cap.

2. The thermocouple of claim 1, wherein a band is applied around a portion of said loop to maintain a predetermined radius of curvature of the loop.

3. The thermocouple of claim 1, wherein said loop has a radius of curvature of about 5 mm.

4. The thermocouple of claim 1, wherein said loop has a radius of about 12 mm.

5. The thermocouple of claim 1, wherein said loop has a radius of curvature of between about 2 mm and about 25 mm.

6. The thermocouple of claim 1, wherein said loop has a radius of curvature of between about 2 mm and 12 mm.

7. The thermocouple of claim 1, wherein said loop has a radius of curvature that increases as said first and second wires thermally expand and decreases as said first and second wires thermally contract.

8. A thermocouple comprising:
   a support tube having a pair of bores extending therethrough;
   a pair of wires formed of dissimilar metals, each of said wires being disposed within a different one of said bores of said support tube; and
   a cap having a pair of apertures formed therethrough, wherein each of said apertures receives one of said pair of wires, said cap being fixedly attached to said support tube, and said apertures being sized to allow said wires to slide freely through said pair of apertures during thermal expansion or contraction of said wires while maintaining said pair of wires in a spaced-apart relationship therebetween; and
   wherein said pair of wires are exposed as they exit said apertures formed in said cap and a protective tube encases a portion of said exposed pair of wires as said pair of wires exit said pair of apertures formed in said cap.

9. A cap connectable to a support tube of a thermocouple for receiving a pair of wires, said cap comprising:
   a body having a first end and a second end;
   a first bore extending into said body from said first end, said support tube being receivable in said first bore;
   a second bore extending into said body from said second end;
   a web separating said first bore and said second bore;
   a first aperture formed through said web, one of said wires being receivable in said first aperture;
   a second aperture formed through said web, the other of said wires being receivable in said second aperture, and said second aperture spaced apart from said first aperture a distance to maintain said wires in a spaced-apart relationship; and
   said apertures being sized to allow said wires to freely translate therethrough when said wires expand or contract as a result of thermal expansion or contraction of said wires.

* * * * *